(12) United States Patent
Kerselaers et al.

(10) Patent No.: US 9,819,097 B2
(45) Date of Patent: Nov. 14, 2017

(54) ANTENNA SYSTEM

(71) Applicant: NXP B.V., Eindhoven (NL)

(72) Inventors: Anthony Kerselaers, Herselt (BE);
Liesbeth Gomme, Leuven (BE)

(73) Assignee: NXP B.V., Eindhoven (NL)

( * ) Notice: Subject to any disclaimer, the term of this patent is extended or adjusted under 35 U.S.C. 154(b) by 51 days.

(21) Appl. No.: 14/836,681

(22) Filed: Aug. 26, 2015

(65) Prior Publication Data

US 2017/0062949 A1    Mar. 2, 2017

(51) Int. Cl.
| | | |
|---|---|---|
| *H01Q 21/00* | (2006.01) | |
| *H04B 5/00* | (2006.01) | |
| *H01Q 1/27* | (2006.01) | |
| *H01Q 7/08* | (2006.01) | |
| *H01Q 9/28* | (2006.01) | |

(52) U.S. Cl.
CPC ......... *H01Q 21/0006* (2013.01); *H01Q 1/273* (2013.01); *H01Q 7/08* (2013.01); *H01Q 9/285* (2013.01); *H04B 5/0031* (2013.01); *H04B 5/0087* (2013.01)

(58) Field of Classification Search
None
See application file for complete search history.

(56) References Cited

U.S. PATENT DOCUMENTS

| | | |
|---|---|---|
| 3,766,476 A | 10/1973 | Silitch |
| 4,334,315 A | 6/1982 | Ono |
| 4,692,743 A | 9/1987 | Holden |
| 5,673,054 A | 9/1997 | Hama |
| 5,708,732 A | 1/1998 | Merhav et al. |
| 5,907,522 A | 5/1999 | Teodoridis |
| 5,914,701 A | 6/1999 | Gersheneld |
| 5,926,573 A | 7/1999 | Kim et al. |
| 5,948,006 A | 9/1999 | Mann |
| 6,104,913 A | 8/2000 | McAllister |
| 6,211,799 B1 | 4/2001 | Post et al. |
| 6,223,018 B1 | 4/2001 | Fukumoto et al. |
| 6,275,737 B1 | 8/2001 | Mann |
| 6,424,820 B1 | 7/2002 | Burdick et al. |

(Continued)

FOREIGN PATENT DOCUMENTS

| | | |
|---|---|---|
| CN | 102013895 A | 4/2011 |
| CN | 102570000 A | 7/2012 |

(Continued)

OTHER PUBLICATIONS

Non-Final Office Action mailed Jan. 3, 2017 for U.S. Appl. No. 14/576,030, 39 pages.

(Continued)

*Primary Examiner* — Trinh Dinh

(57) ABSTRACT

A near-field electromagnetic induction antenna including: an electric antenna including a plate; a first feeding connection and a second feeding connection; and a magnetic antenna including a first coil and a second coil, wherein the first coil and the second coil are mutually coupled, wherein a first connection of the first coil is connected to the first feeding connection, wherein a second connection of the first coil and a first connection of the second coil is connected to the second feeding connection, and wherein a second connection of the second coil is connected to the plate.

20 Claims, 7 Drawing Sheets

(56) References Cited

U.S. PATENT DOCUMENTS

| | | | |
|---|---|---|---|
| 6,754,472 B1 | 6/2004 | Williams | |
| 6,816,600 B1 | 11/2004 | Jakob | |
| 7,142,681 B2 | 11/2006 | Kortekaas | |
| 7,171,177 B2 | 1/2007 | Park et al. | |
| 7,206,423 B1 | 4/2007 | Feng et al. | |
| 7,254,246 B2 | 8/2007 | Jakob | |
| 7,509,092 B2 | 3/2009 | Ishibashi et al. | |
| 7,664,476 B2 | 2/2010 | Yanagida | |
| 7,684,769 B2 | 3/2010 | Song et al. | |
| 7,783,067 B1 | 8/2010 | Frerking | |
| 7,796,943 B2 | 9/2010 | Levan | |
| 7,907,057 B2 | 3/2011 | Schaffler et al. | |
| 8,005,547 B2 | 8/2011 | Forsberg | |
| 8,237,622 B2* | 8/2012 | Furumura | G06K 19/07749 343/795 |
| 8,265,554 B2 | 9/2012 | Hwang | |
| 8,280,302 B2 | 10/2012 | Kubono | |
| 8,401,470 B2 | 3/2013 | Kroenstoel et al. | |
| 8,452,234 B2 | 5/2013 | Hasegawa et al. | |
| 8,509,689 B2 | 8/2013 | Nakamura et al. | |
| 8,526,879 B2 | 9/2013 | Kristiansen | |
| 8,606,177 B2 | 12/2013 | Hwang | |
| 8,644,542 B2 | 2/2014 | Klemenz | |
| 8,797,148 B2 | 8/2014 | Kato et al. | |
| 8,829,725 B2 | 9/2014 | Urano | |
| 8,878,735 B2 | 11/2014 | Kvist et al. | |
| 8,892,055 B2 | 11/2014 | Gasperi | |
| 8,909,966 B2 | 12/2014 | Furukawa | |
| 9,019,131 B2 | 4/2015 | Kim | |
| 9,024,725 B2 | 5/2015 | Ikemoto | |
| 9,083,391 B2 | 7/2015 | Teggatz | |
| 9,130,273 B2 | 9/2015 | Kataoka | |
| 9,197,986 B1 | 11/2015 | Kerselaers et al. | |
| 9,314,381 B2* | 4/2016 | Curran | A61F 13/42 |
| 9,455,771 B2 | 9/2016 | Dobyns | |
| 9,647,462 B2 | 5/2017 | Angst et al. | |
| 2002/0003503 A1* | 1/2002 | Justice | G08B 13/2477 343/788 |
| 2002/0181579 A1 | 12/2002 | Vetro et al. | |
| 2004/0023216 A1 | 2/2004 | Lu et al. | |
| 2004/0027296 A1 | 2/2004 | Gerber | |
| 2004/0138723 A1 | 7/2004 | Malick et al. | |
| 2005/0058201 A1 | 3/2005 | Fernandes | |
| 2006/0008038 A1 | 1/2006 | Song et al. | |
| 2006/0114993 A1 | 6/2006 | Xiong et al. | |
| 2006/0134918 A1 | 6/2006 | Fujii et al. | |
| 2006/0215919 A1 | 9/2006 | Srinivasan | |
| 2006/0233258 A1 | 10/2006 | Holcomb | |
| 2006/0252371 A1 | 11/2006 | Yanagida | |
| 2007/0058713 A1 | 3/2007 | Shen et al. | |
| 2007/0116308 A1 | 5/2007 | Zurek et al. | |
| 2007/0190940 A1 | 8/2007 | Lee et al. | |
| 2007/0291970 A1 | 12/2007 | Nikles | |
| 2008/0182517 A1 | 7/2008 | Rass | |
| 2008/0186241 A1 | 8/2008 | Christensen | |
| 2008/0261523 A1 | 10/2008 | Kubono et al. | |
| 2008/0262376 A1 | 10/2008 | Price | |
| 2008/0267436 A1 | 10/2008 | Kerselaers et al. | |
| 2009/0041241 A1 | 2/2009 | Dobyns et al. | |
| 2009/0067653 A1 | 3/2009 | Meskens et al. | |
| 2009/0202084 A1 | 8/2009 | Joeng et al. | |
| 2009/0238279 A1 | 9/2009 | Tu et al. | |
| 2009/0315787 A1 | 12/2009 | Schatzle | |
| 2009/0322540 A1 | 12/2009 | Richardson et al. | |
| 2010/0036773 A1 | 2/2010 | Bennett | |
| 2010/0136905 A1 | 6/2010 | Kristiansen | |
| 2010/0311326 A1 | 12/2010 | Klabunde et al. | |
| 2011/0029041 A1 | 2/2011 | Wiskerke | |
| 2011/0046730 A1 | 2/2011 | Meskens | |
| 2011/0137649 A1 | 6/2011 | Rasmussen | |
| 2011/0196452 A1 | 8/2011 | Forsell | |
| 2011/0248673 A1 | 10/2011 | Aerts et al. | |
| 2011/0250837 A1 | 10/2011 | Hwang et al. | |
| 2011/0255702 A1 | 10/2011 | Jensen | |
| 2011/0300801 A1 | 12/2011 | Kerselaers | |
| 2012/0032778 A1 | 2/2012 | Nakano et al. | |
| 2013/0002517 A1 | 1/2013 | Pascolini et al. | |
| 2013/0148828 A1 | 6/2013 | Fort | |
| 2013/0171933 A1 | 7/2013 | Rofougaran | |
| 2013/0278470 A1 | 10/2013 | Kataoka | |
| 2013/0308805 A1 | 11/2013 | Ozden | |
| 2013/0339025 A1 | 12/2013 | Suhami | |
| 2014/0008446 A1* | 1/2014 | Carr | H01Q 1/248 235/492 |
| 2014/0023216 A1 | 1/2014 | Solum et al. | |
| 2014/0049440 A1 | 2/2014 | Ueki et al. | |
| 2014/0062212 A1 | 3/2014 | Sun et al. | |
| 2014/0184462 A1 | 7/2014 | Yosui | |
| 2014/0213184 A1 | 7/2014 | Matsubara | |
| 2014/0241555 A1 | 8/2014 | Terlizzi | |
| 2014/0315486 A1 | 10/2014 | Broyde et al. | |
| 2014/0320369 A1 | 10/2014 | Azenui et al. | |
| 2014/0340032 A1 | 11/2014 | Curtis | |
| 2015/0001956 A1 | 1/2015 | Saen | |
| 2015/0028690 A1 | 1/2015 | Sako | |
| 2015/0038075 A1 | 2/2015 | Kataoka | |
| 2015/0038864 A1 | 2/2015 | Kataoka et al. | |
| 2015/0048985 A1 | 2/2015 | Park et al. | |
| 2015/0061587 A1 | 3/2015 | Bruechmann | |
| 2015/0079902 A1 | 3/2015 | Dhayni | |
| 2015/0092962 A1 | 4/2015 | Amento | |
| 2015/0097442 A1 | 4/2015 | Muurinen | |
| 2015/0130465 A1 | 5/2015 | Wiggins et al. | |
| 2015/0318603 A1 | 11/2015 | Kerselaers et al. | |
| 2015/0318613 A1 | 11/2015 | Kerselaers et al. | |
| 2015/0318896 A1 | 11/2015 | Kerselaers et al. | |
| 2015/0318932 A1 | 11/2015 | Kerselaers et al. | |
| 2015/0319545 A1 | 11/2015 | Kerselaers et al. | |
| 2015/0351292 A1 | 12/2015 | Chang et al. | |
| 2016/0189860 A1* | 6/2016 | Konanur | H01F 38/14 343/718 |
| 2017/0125883 A1 | 5/2017 | Tenno | |

FOREIGN PATENT DOCUMENTS

| | | |
|---|---|---|
| CN | 103024621 A1 | 4/2013 |
| KR | 101584555 B1 | 1/2016 |
| WO | WO03030991 A1 | 4/2003 |
| WO | WO2013183575 | 12/2013 |

OTHER PUBLICATIONS

Non-Final Office Action for U.S. Appl. No. 14/576,583, Nov. 3, 2016, 33 pages.

Kado, et al., "RedTacton Near-body Electric-field Communications Technology and Its Applications", NTT Technical Review vol. 8, No. 3; NTT Microsystems Integration Laboratories, Atsugi-shi, JP;, Mar. 2010, pp. 1-6.

Non-Final Office Action mailed Jan. 19, 2017 for U.S. Appl. No. 14/575,865, 45 pages.

Non-Final Office Action mailed Jan. 19, 2017 for U.S. Appl. No. 14/551,988, 21 pages.

Non Final Office Action mailed Aug. 26, 2016 for U.S. Appl. No. 14/270,013, 13 pages.

Final Office Action mailed Aug. 27, 2015 for U.S. Appl. No. 14/270,013, 17 pages.

International Search Report and Written Opinion mailed Jul. 13, 2015 for PCT/EP2015/058044, 11 pages.

Non-Final Office Action mailed Feb. 29, 2016 for U.S. Appl. No. 14/270,013, 11 pages.

Non-Final Office Action mailed May 7, 2015 for U.S. Appl. No. 14/270,013, 12 pages.

International Search Report and Written Opinion mailed Jul. 17, 2015 for PCT/EP2015/058052, 9 pages.

Notice of Allowance mailed Jul. 21, 2015 for U.S. Appl. No. 14/302,791, 9 pages.

International Search Report and Written Opinion mailed Jul. 7, 2015 for PCT/EP2015/058071, 11 pages.

U.S. Appl. No. 14/551,988, filed Nov. 24, 2014, entitled "Electromagnetic Field Induction for Inter-Body and Transverse Body Communication".

(56) References Cited

OTHER PUBLICATIONS

European Search Report dated Aug. 31, 2015 for EP 15164678, 6 pages.
Final Office Action mailed Mar. 7, 2016 for U.S. Appl. No. 14/576,030, 13 pages.
Non-Final Office Action mailed Oct. 5, 2015 for U.S. Appl. No. 14/576,030, 17 pages.
European Search Report dated Aug. 31, 2015 for EP 15164622, 6 pages.
Final Office Action mailed Feb. 25, 2016 for U.S. Appl. No. 14/576,583, 13 pages.
Non-Final Office Action mailed Sep. 21, 2015 for U.S. Appl. No. 14/576,583, 17 pages.
European Search Report dated Aug. 31, 2015 for EP 15164621, 8 pages.
Non-Final Office Action mailed Oct. 5, 2015 for U.S. Appl. No. 14/569,024, 14 pages.
Final Office Action mailed Feb. 25, 2016 for U.S. Appl. No. 14/569,024, 13 pages.
Non-Final Office Action mailed Oct. 5, 2015 for U.S. Appl. No. 14/575,865, 17 pages.
Final Office Action mailed Mar. 4, 2016 for U.S. Appl. No. 14/575,865, 14 pages.
European Search Report dated Aug. 31, 2015 for EP 15164610, 6 pages.
U.S. Appl. No. 15/146,665, filed May 4, 2016, entitled "Near-Field Electromagnetic Induction (NFEMI) Antenna".
Chandrasekar, K., "Inductively Coupled Connectors and Sockets for Multi-Gb/s Pulse Signaling," IEEE Transactions on Advanced Packaging, vol. 31, No. 4; Nov. 1, 2008, pp. 749-758.
Cho, N. et al., "A Planar MICS Band Antenna Combined with a Body Channel Communication Electrode for Body Sensor Network," IEEE Transactions on Microwave Theory and Techniques, vol. 57, No. 10; Oct. 2009; pp. 2515-2522.
Ohishi, T. et al., "Novel Pair Electrode With Coils Sensing Magnetic Energy on Human Body Surface for Intrabody Communication," IEEE International Symposium on Antennas and Propagation (ISAP); Oct. 29, 2012; pp. 203-206.
Shinagawa, M. et al., "A Near-Field-Sensing Transceiver for Intra-Body Communication Based on the Electro-Optic Effect," Instrumentation and Measurement Technology Conference, Vail, CO; May 20-22, 2003; 6 pages.
Tounsi, F. et al. "Electromagnetic Modeling of an Integrated Micromachined Inductive Microphone," IEEE 4th International Conference on Design and Technology of Integrated Systems in Nanoscale Era; Apr. 6, 2009; pp. 38-43.
Zimmerman, T.G., "Personal Area Networks (PAN): Near-Field Intra-Body Communication," Massachusetts Institute of Technology, Jun. 1995, 81 pages.
Zimmerman, T.G., "Personal Area Networks: Near-Field Intrabody Communication," IBM Systems Journal; vol. 35, Nos. 3 and 4; 1996; 9 pages.
Non Final Office Action mailed Jun. 29, 2016 for U.S. Appl. No. 14/551,988, 23 pages.
Non-Final Office Action mailed Jan. 25, 2017 for U.S. Appl. No. 14/569,024, 51 pages.
Final Office Action mailed Mar. 14, 2017 for U.S. Appl. No. 14/270,013, 37 pages.
Notice of Allowance dated Jun. 7, 2017 for U.S. Appl. No. 14/551,988, 25 pages.
Notice of Allowance dated Jun. 27, 2017 for U.S. Appl. No. 14/576,030 30 pages.
Notice of Allowance dated Jun. 21, 2017 for U.S. Appl. No. 14/576,583 34 pages.
Final Office Action dated Aug. 9, 2017 for U.S. Appl. No. 14/569,024, 52 pages.
Final Office Action dated Jul. 27, 2017 for U.S. Appl. No. 14/575,865, 56 pages.

\* cited by examiner

ANTENNA SYSTEM

TECHNICAL FIELD

Various exemplary embodiments disclosed herein relates generally to a near-field electromagnetic induction (NFEMI) antenna system.

BACKGROUND

There exist a variety of wireless systems which, illustratively, are used for short range distance communication. Some systems are used for communication around the human body; other systems may be used for communication in or around other objects. Hearing aids, headphones, smart watches, activity trackers, heart rate monitors, etc. are a few examples of such systems. For example, currently RF based hearing aids are considered for wireless communication. Often such hearing aid systems operate in the 2.5 GHz ISM band. Such systems feature propagation by means of transverse waves, the magnetic and electric fields being in phase and covering a relatively large range of perhaps 30 meters. The large range may cause problems in terms of security of the communication content and may cause interference. Furthermore, because of their relatively high frequency of operation, such systems are heavily influenced by the human body.

Somewhat more conventional hearing aids employ near-field magnetic field induction as a wireless communication method. Unfortunately, near-field magnetic field induction based wireless systems have a limited range if the antenna is comparatively small, such as would be required in a hearing aid. Not all parts of the human body can be reached with near-field magnetic field induction-based systems with small antennas. Consequently, it can be difficult to provide communication between a hearing aid and a hand-held control using such systems.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to near-field electromagnetic induction antenna including: an electric dipole antenna including a first plate and a second plate spaced apart from the first plate, wherein the first and second plate form a capacitor; a first feeding connection and a second feeding connection; and a magnetic antenna including a first coil and a second coil, wherein the first coil and the second coil are mutually coupled, wherein a first connection of the first coil and a first plate are connected to the first feeding connection, wherein a second connection of the first coil and a first connection of the second coil is connected to the second feeding connection, and wherein a second connection of the second coil is connected to the second plate.

Various embodiments are described wherein the first coil and the second coil are wrapped around a ferrite core.

Various embodiments are wherein the first coil and the second coil are planar coils wherein the second coil is inside the first coil.

Various embodiments are wherein the second plate is spaced apart from the first coil and the second coil and is positioned over an opening in the second coil.

Various embodiments are wherein the second plate is spaced apart from the first coil and the second coil and is positioned over the first coil.

Various embodiments are wherein the first plate surrounds the first coil and the second coil and is positioned substantially coplanar with the first and second coil.

Further, various exemplary embodiments relate to a near-field electromagnetic induction antenna including: an electric antenna including a plate; a first feeding connection and a second feeding connection; and a magnetic antenna including a first coil and a second coil, wherein the first coil and the second coil are mutually coupled, wherein a first connection of the first coil is connected to the first feeding connection, wherein a second connection of the first coil and a first connection of the second coil is connected to the second feeding connection, and wherein a second connection of the second coil is connected to the plate.

Various embodiments are wherein the first coil and the second coil are wrapped around a ferrite core.

Various embodiments are wherein the first coil and the second coil are planar coils wherein the second coil is inside the first coil.

Various embodiments are wherein the plate is spaced apart from the first coil and the second coil and is positioned over an opening in the second coil.

Various embodiments are wherein the plate is spaced apart from the first coil and the second coil and is positioned over the first coil Further, various exemplary embodiments relate to a near-field electromagnetic induction wireless transceiver including: a near-field electromagnetic induction antenna including: an electric dipole antenna including a first plate and a second plate spaced apart from the first plate, wherein the first and second plate form a capacitor; a first feeding connection and a second feeding connection; and a magnetic antenna including a first coil and a second coil, wherein the first coil and the second coil are mutually coupled, wherein a first connection of the first coil and a first plate are connected to the first feeding connection, wherein a second connection of the first coil and a first connection of the second coil is connected to the second feeding connection, and wherein a second connection of the second coil is connected to the second plate; a signal source configured to produce a communication signal used to drive the near-field electromagnetic induction antenna to produce near-field electromagnetic induction fields; and a receiver connected to the near-field electromagnetic induction antenna configured to receive a communication signal using near-field electromagnetic induction fields, wherein the transceiver when connected to a body is configured to communicate with another near-field electromagnetic induction wireless transceiver connected to the body.

Various embodiments are wherein the first coil and the second coil are wrapped around a ferrite core.

Various embodiments are described wherein the first coil and the second coil are planar coils wherein the second coil is inside the first coil.

Various embodiments are described wherein the first plate surrounds the first coil and the second coil and is positioned substantially coplanar with the first and second coil and wherein the second plate is spaced apart from the first coil and the second coil.

Various embodiments are described wherein the transceiver is implemented in one of a hearing aid, headphones, or a wearable device.

Further, various exemplary embodiments relate to a near-field electromagnetic induction wireless transceiver including: a near-field electromagnetic induction antenna including: an electric antenna including a plate; a first feeding connection and a second feeding connection; and a magnetic antenna including a first coil and a second coil, wherein the first coil and the second coil are mutually coupled, wherein a first connection of the first coil is connected to the first feeding connection, wherein a second connection of the first coil and a first connection of the second coil is connected to the second feeding connection, and wherein a second connection of the second coil is connected to the plate; a signal source configured to produce a communication signal used to drive the near-field electromagnetic induction antenna to produce near-field electromagnetic induction fields; and a receiver connected to the near-field electromagnetic induction antenna configured to receive a communication signal using near-field electromagnetic induction fields, wherein the transceiver when connected to a body is configured to communicate with another near-field electromagnetic induction wireless transceiver connected to the body.

Various embodiments are described wherein the first coil and the second coil are wrapped around a ferrite core.

Various embodiments are described wherein the first coil and the second coil are planar coils wherein the second coil is inside the first coil and wherein the plate is spaced apart from the first coil and the second coil.

Various embodiments are described wherein the transceiver is implemented in one of a hearing aid, headphones, or a wearable device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Figure 13:
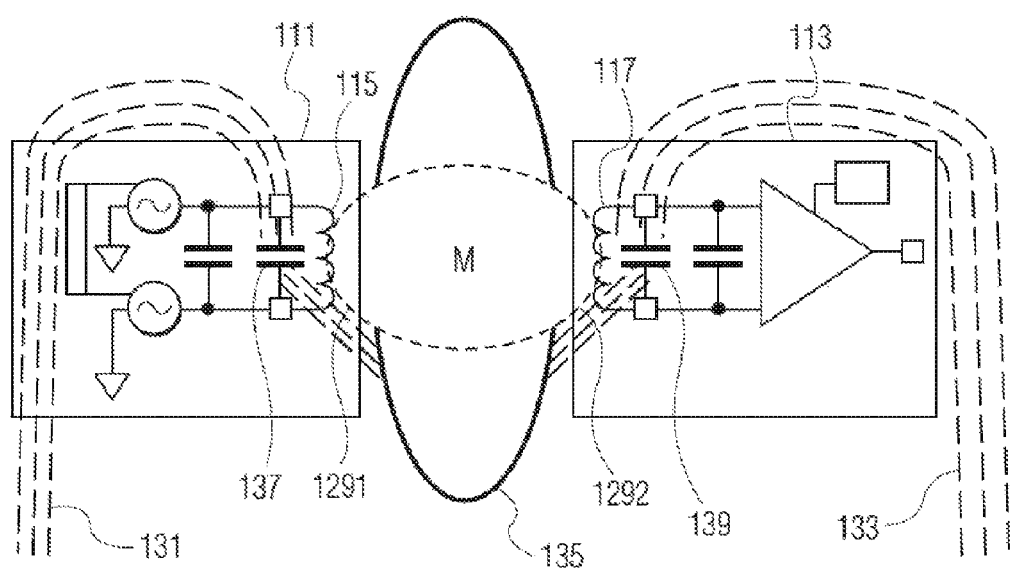
FIG. 13 illustrates an embodiment of a NFEMI antenna system including transceivers.

In a related U.S. patent application Ser. No. 14/270,013 entitled "ELECTROMAGNETIC INDUCTION FIELD COMMUNICATION" filed on May 5, 2014, hereby incorporated by reference for all purposes, a near-field electromagnetic induction (NFEMI) communication method near a human body by means of a combination of a magnetic field and electric field with no intention to form transversal radiating waves is described. This results in a method that improves the link budget and extends the range to the complete body and intra-body. The magnetic field is generated by a current through a first coil. The electric field can be generated by a first coupling capacitor, having a first conducting plate coupled to the human body and a second conducting plate coupled to the environment. The magnetic and electric field may be received by a receiver at another place near the human body by means of a second coil and a second coupling capacitor, the second capacitor having a first conducting plate coupled to the human body and a second conducting plate coupled to the environment. An example of transmitter 111 and receiver 113 (each of which may be a transceiver) connected to a body 135 via electric fields 131 and 133 and magnetic fields 1291 and 1292 is shown in FIG. 13, which is equivalent to FIG. 2 of the U.S. patent application Ser. No. 14/270,013. Transmitter or transceiver 111 and receiver or transceiver 113 implement one embodiment of an antenna that includes a coil (such as 115 and 117) and a capacitor (such as 137 and 139).

Whereas RF wireless communication may be accomplished by propagating an RF plane wave through free space, NFEMI communication utilizes non-propagating quasi-static fields. The quasi-static characteristic of the fields is the result of antenna dimensions in combination with the carrier frequency. The majority of the energy is stored in the form of magnetic and electric fields and a small amount of RF energy inevitably propagates in free space.

Small antenna geometries compared with the carrier wavelength are candidate NFEMI antennas because they do not generate radiating waves in free space. Such an antenna may be composed of a coil antenna (magnetic antenna) in conjunction with a short loaded dipole (electric antenna), see FIG. 1. Such an antenna when in close proximity to the body will generate fields that are confined near the body.

However implementation in small volume products, like earbuds, hearing aids, or smart watches, require very small antenna constructions that may reduce the robustness of the wireless communication link.

Therefore an antenna system is described below that provides an increased electric field strength in transmit mode and increases the received voltage in receive mode. As a result, this antenna system improves the reliability for wireless body communication in applications such as consumer lifestyle and healthcare area. This antenna system may be integrated into very small wireless portable products connected to the human body. Examples include behind-the-ear hearing aids, in-ear hearing aids, in-ear-canal hearing aids, earbuds, smart watches, and others.

A near-field electromagnetic antenna system is described below which includes a combination of a short loaded dipole with one or two loading plates and a small loop antenna. The small loop antenna has at least two mutual coupled coils. Both coils are connected in series in such a way that they form a larger inductance compared with the inductance of one of the coils. Both coils may be on a ferrite material or they may be in the form of a planar structure. The first connection of the first coil may be connected to the first feeding connection and to the first loading plate of the small loaded dipole. The second connection of the first coil may be connected to the first connection of the second coil and to the second feeding connection. The second connection of the second coil may be connected to second loading plate of the small loaded dipole.

Figure 1:
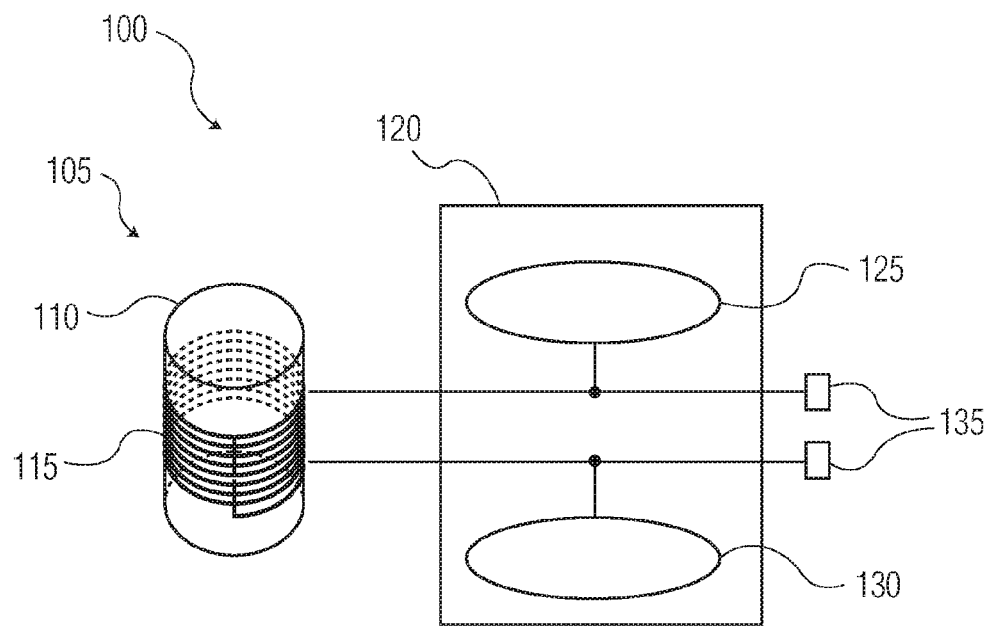
FIG. 1 illustrates a near-field electromagnetic induction antenna.

FIG. 1 illustrates a near-field electromagnetic induction antenna. The antenna 100 may include a coil antenna 105 (magnetic antenna) in conjunction with a short loaded dipole 120 (electric antenna) and feeding connections 135. The coil antenna 105 may include a ferrite core 110 with a wire 115 wound around the core 110. The short dipole 120 may include two loading plates 125 and 130. In close proximity of the body, this antenna will provide fields that are confined near the body. The preferred transmit frequency is below 30 MHz to ensure that the fields are following the body contours and far field radiation is strongly reduced.

Figure 2:
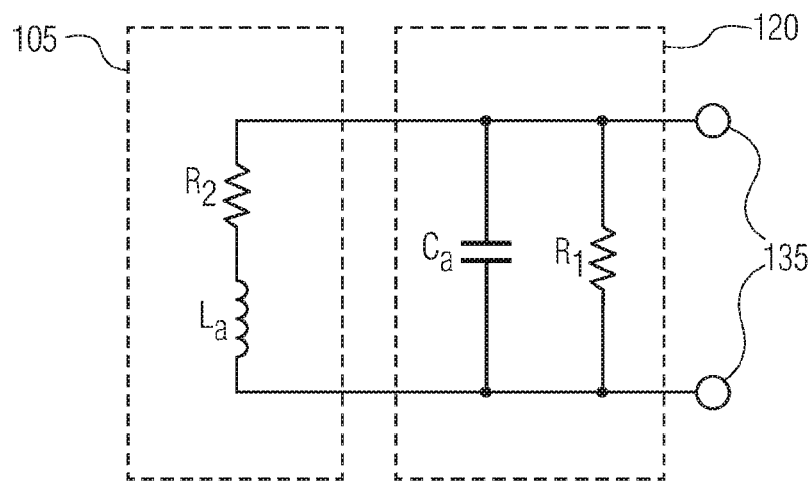
FIG. 2 illustrates the equivalent schematic of the near-field electromagnetic induction antenna of FIG. 1.

FIG. 2 illustrates the equivalent schematic of the near-field electromagnetic induction antenna of FIG. 1. The short loaded dipole 120 will act mainly as a capacitor, and the small loop antenna 105 will act as a coil at the frequencies of interest (for example, below 30 MHz). For example, the small loop antenna 105 and the short loaded dipole 120 may be arranged in a parallel circuit, but other configurations are possible. A shunt circuit including a capacitor Ca and a resistor R1 represent the short loaded dipole 120. The small loop antenna 105 is represented by a series circuit including an inductor La and a resistor R2.

Figure 3:
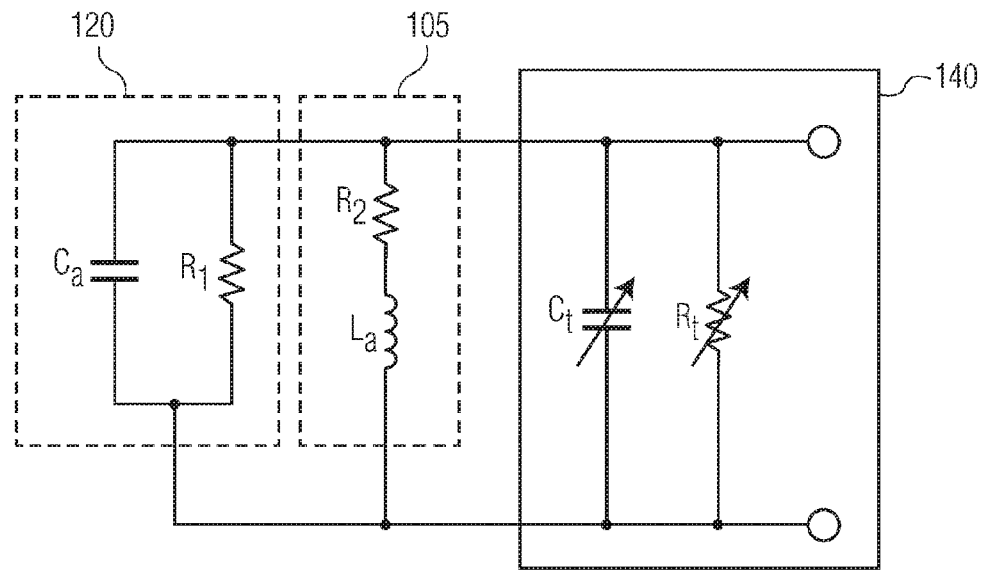
FIG. 3 illustrates the near-field electromagnetic induction antenna system when it is tuned to the transmit frequency by a tuning capacitor.

FIG. 3 illustrates the near-field electromagnetic induction antenna system when it is tuned to the transmit frequency by a tuning capacitor. The tuning circuit 140 may include a variable capacitance Ct. The value of Ct may be set by an external control signal or by software. The tuning circuit 140 may also include a variable resistor Rt, that controls the quality factor of the antenna system and hence the transmission bandwidth. The value of Rt may also be set by an external control signal or by software. The tuning circuit 140 may be integrated into a radio frequency (RF) communication integrated circuit (IC.)

Figure 4:
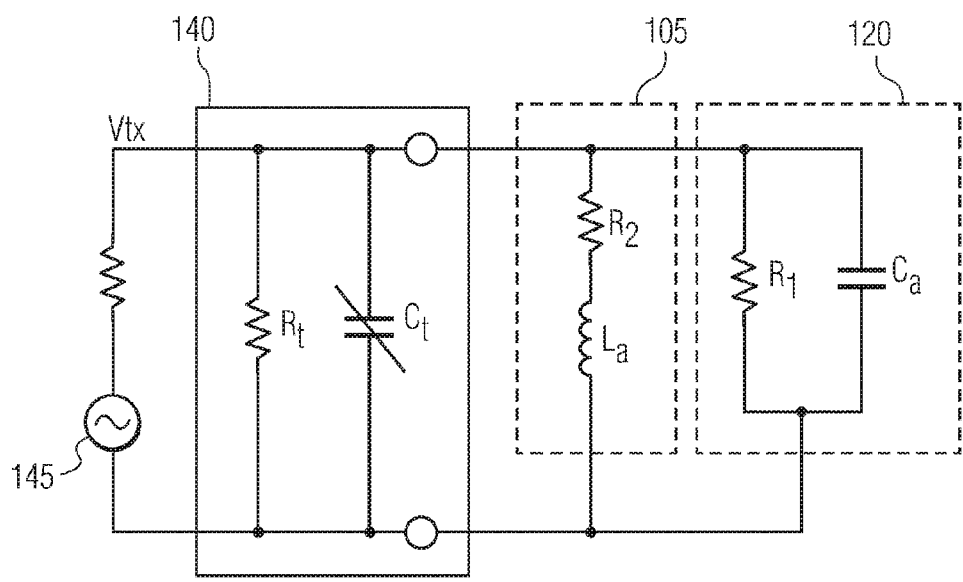
FIG. 4 displays a near-field electromagnetic induction antenna in a transmit mode.

FIG. 4 displays a near-field electromagnetic induction antenna in a transmit mode. A voltage source 145 of a transmit amplifier applies a voltage Vtx on the small loop antenna 105 and the short loaded dipole 120. The voltage across the small loop antenna 105 generates a current through the coil La. When a current in the coil La is flowing, a magnetic field will be generated around the transmission coil. The generated magnetic field is a linear function of the current through the coil La. The voltage across the small loaded dipole 120 charges the loading plates 125 and 130 and generates an electric field between the loading plates and its environment. The generated electric field is a linear function of the voltage across the loading plates 125 and 130. Both fields are quasi static in nature and do not radiate in the far field.

Figure 5:
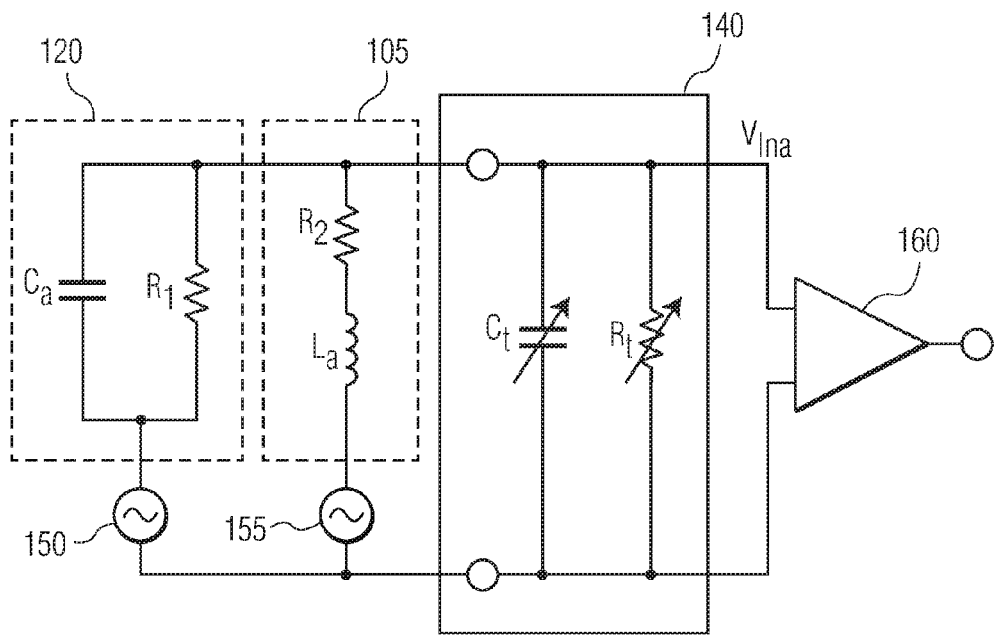
FIG. 5 shows a typical near-field electromagnetic induction antenna in a receive mode.

FIG. 5 shows a typical near-field electromagnetic induction antenna in a receive mode. The magnetic field generated by the transmission coil will induce a voltage in a reception coil. The electric field generated by the transmission small loaded dipole will induce a voltage in the reception small loaded dipole 105. The receive system may include the tuning circuit 140 and a low noise amplifier (LNA) 160 to amplify the received signal. Because both induced voltages may have a 180 degrees phase relationship, they add together in a parallel antenna circuit combination. In this way, wireless communication may be accomplished.

The induced voltage in the short loaded dipole 120 will be transferred to the LNA 160 input according the following calculation:

$$V = V\text{induced} \times Q \times (Ca/(Ca+Ct)),$$

where Q is the quality factor of the antenna system, Ca is the antenna capacitance, and Ct is the tuning capacitance.

For example in an earbud application, the antenna capacitance is 3 pF and the tuning capacitor is 52 pF. If the induced voltage is 1 uV, the voltage at the LNA input becomes 1.32 uV. In this example the antenna system has a ferrite coil of 2 mm diameter and 6 mm length with an inductance of 3 uH. The antenna circuit is tuned at 11 MHz with a bandwidth of 450 kHz.

The systems described in FIGS. 1-6 have been found to have challenges producing a strong enough signal in order to effectively communicate, especially in systems with size constraints, such as for example, earbud headphones and hearing aids. The size constraints limit the size of the loaded dipole and small loop that may be used, leading to systems that may not effectively communicate using NFEMI. Small loaded dipoles especially lead to a limit on the amount of voltage that may be transferred to the LNA in a frequency tuned receiver. Accordingly, it would be desirable to improve the antenna design such that effective NFEMI communication may be achieved with small devices.

Figure 6:
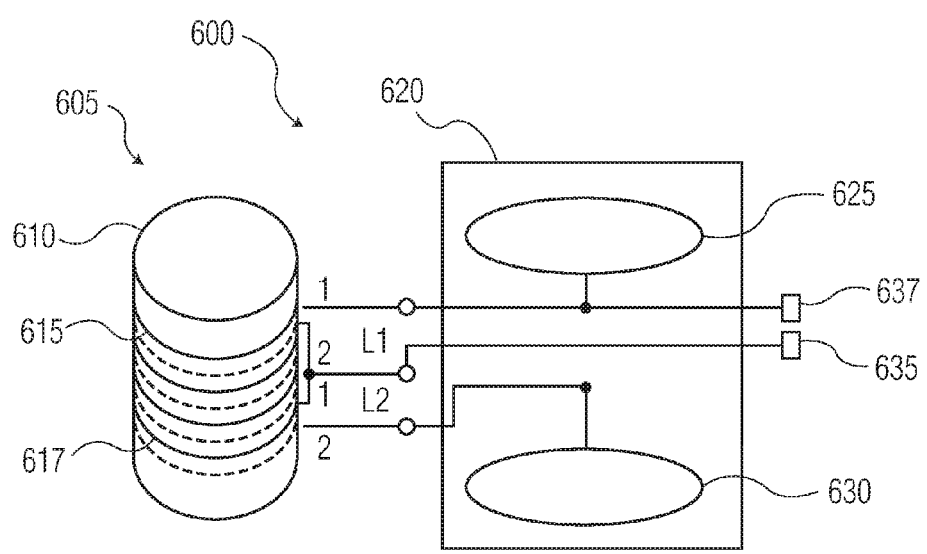
FIG. 6 illustrates an embodiment of a near-field electromagnetic induction antenna.
Figure 7:
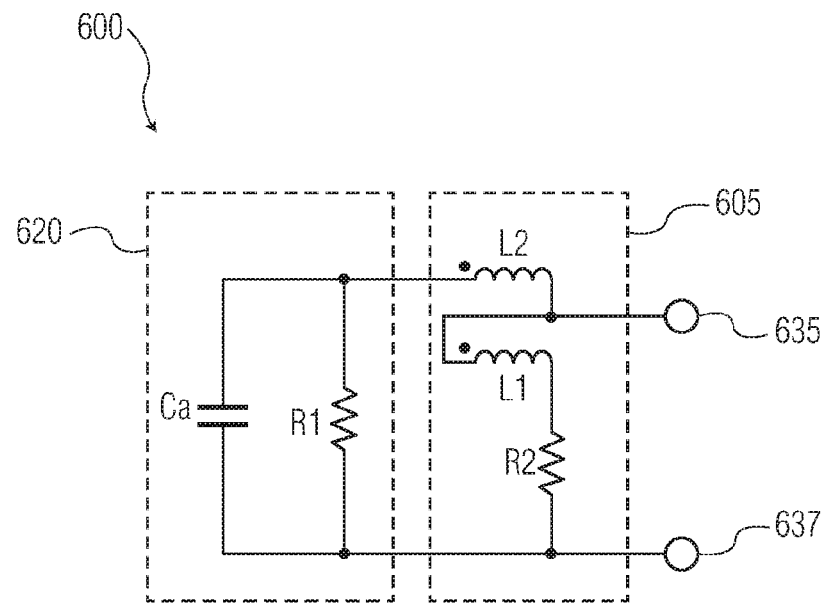
FIG. 7 illustrated a lumped model of the NFEMI antenna system of FIG. 6.

FIG. 6 illustrates an embodiment of a near-field electromagnetic induction antenna. FIG. 7 illustrates a lumped model of the NFEMI antenna system of FIG. 6. The antenna system 600 is a combination of a short loaded dipole 620 with one or two plates 625 and 630 and a small loop antenna 605. The small loop antenna includes at least two coupled coils 615 and 617. The first coil 615 has an inductance of L1, and the second coil 617 has an inductance of L2. Both coils 615 and 617 may be connected such that they form a larger inductance compared with the inductance of the first coil 615 and the second coil 617. Both coils 615 and 617 may be air coils, wrapped around a ferrite core 610, or they can be in the form of a planar structure. For example, in FIG. 6 the two coils 615 and 617 are wrapped around a ferrite core 610. In one example the coils 615 and 617 may be wrapped around the core 610 in an interleaved fashion. Alternatively the coils 615 and 617 may be wrapped on top of one another, i.e., the second coil 617 is first wrapped around the core 610, and then the first coil 615 is then wrapped around the core 610 on top of the second coil 617. The first connection of the first coil 615 is connected to the first feeding connection 637 and to the first plate of the small loaded dipole 625. The second connection of the first coil 615 is connected to the first connection of the second coil 617 and to the second feeding connection 635. The second connection of the second coil 617 is connected to second plate 630 of the small loaded dipole 620.

Figure 8:
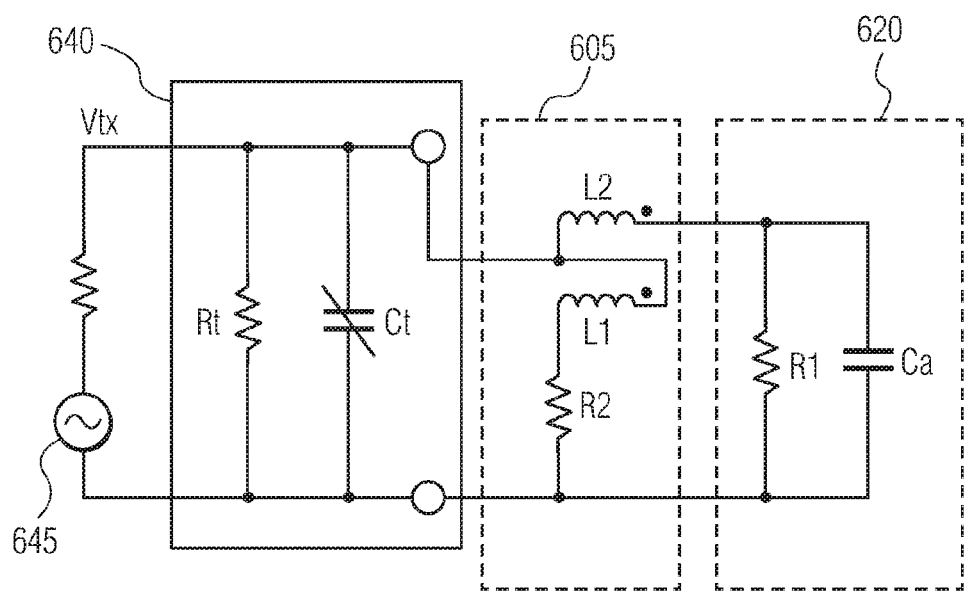
FIG. 8 illustrates the NFEMI antenna system of FIG. 6 in a transmit mode.

FIG. 8 illustrates the NFEMI antenna system of FIG. 6 in a transmit mode. The voltage source 645 of the transmit amplifier applies a voltage Vtx on the small loop antenna 605. The voltage across the first coil 615 and the second coil 617 of the small loop antenna 605 generates a current through the coils 615 and 617. When a current in the coils is flowing, a magnetic field will be generated around the coils. The generated magnetic field is linear function of the current through the coils.

The voltage across the short loaded dipole 620 is higher than Vtx because the first coil 615 and the second coil 617 are coupled and in a series arrangement. The voltage on the short loaded dipole 620 may be calculate by:

$$V = Vtx + k\ Vtx$$

and $$k = \frac{M}{\sqrt{L1 \cdot L2}},$$

where V is the voltage across the short dipole, Vtx the voltage on the first coil 615, k is the magnetic coupling factor between the first coil 615 and the second coil 617, L1 is the inductance of the first coil 615, L2 is the inductance of the second coil 617, and M is the mutual inductance between the first coil 615 and the second coil 617.

For example, when L1 and L2 are similar and the first coil 615 and the second coil 617 are strongly magnetically coupled (k=0.99), the voltage at the short loaded dipole 620 will be twice the voltage on the first coil 615. The voltage across the small loaded dipole 620 charges the loading plates and generates an electric field between the plates and its environment. Because the generated electric field is a linear function of the voltage across the loading plates, a higher electric field is created for the same transmit voltage Vtx.

Figure 9:
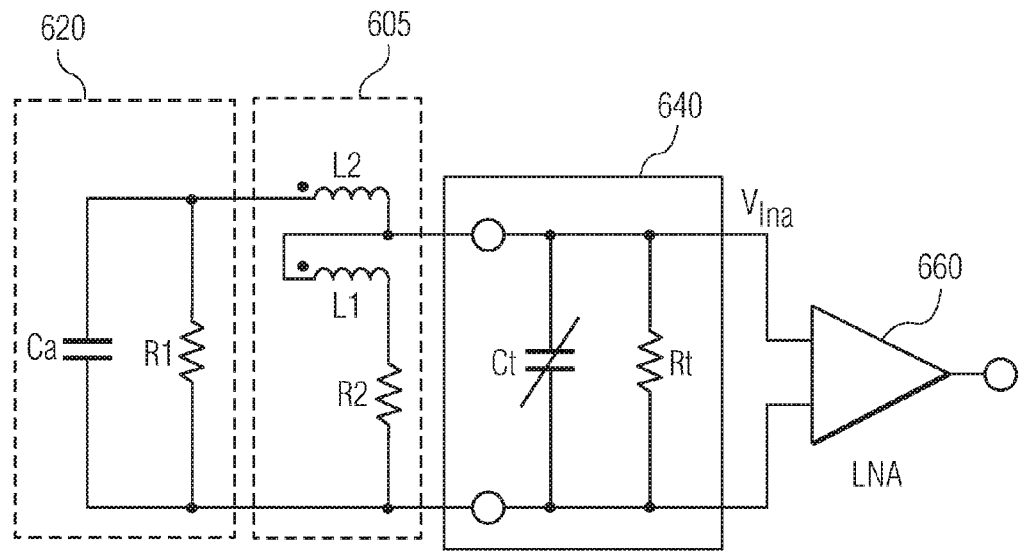
FIG. 9 displays the NFEMI antenna system of FIG. 6 in a receive mode.

FIG. 9 displays the NFEMI antenna system of FIG. 6 in a receive mode. The magnetic field from the transmission coil will induce a voltage in the reception coil. The electric field from the transmission dipole will induce voltage in the reception dipole 620. The receive system may include the tuning circuit 640 and a LNA 660 to amplify the received signal. Because both may have a 180 degrees phase relationship they add together in a parallel antenna combination.

When the first coil 615 and the second coil 617 are magnetically coupled and in a series arrangement, the equivalent capacitance presentation of the short loaded dipole 620 is multiplied as seen at the feeding connections 635 and 637. For a coupling factor, k, of 1 and similar L1 and L2, the virtual capacitance seen at the feeding connections can be found by the impedance transformation equations of a transformer as follows:

$$Cvirtual = Ca \times (Transformer\ Ratio)2.$$

The induced voltage in the short loaded dipole will be transferred to the LNA input according to the following calculation:

$$V = Vinduced \times Q \times (Cvirtual/(Cvirtual + Ct)),$$

where Q is the quality factor of the antenna system, Cvirtual is the virtual antenna capacitance seen from the feeding connections, Ct is the tuning capacitance.

As example, simulations and measurements have been done with an antenna system containing a short loaded dipole with equivalent antenna capacitance of 3 pF and a small loop antenna having two coils of each 3.2 uH inductance on a ferrite core. Both coils have a coupling factor, k, of 0.95. The antenna circuit is tuned for a transmit frequency of 11 MHz and a bandwidth of 450 KHz.

The performance of this antenna system was compared with the typical antenna system described in FIG. 1. The antenna of FIG. 6 lead to an increase of 3.6 db in received voltage as compared to a NFEMI antenna in FIG. 1 with the same antenna parameters. In the transmit mode there was an increase of 6 db of the electrical field.

This example shows that the link budget is improved in receive and transmit mode. The link budget may be defined as, $$\text{Link Budget [dB]} = 20\log_{10}\left(\frac{V_{RX}}{V_{Tx}}\right)$$

where VTx is the transmitter voltage on the transmitter antenna and VRx is the received voltage on the receiver antenna.

Figure 10:
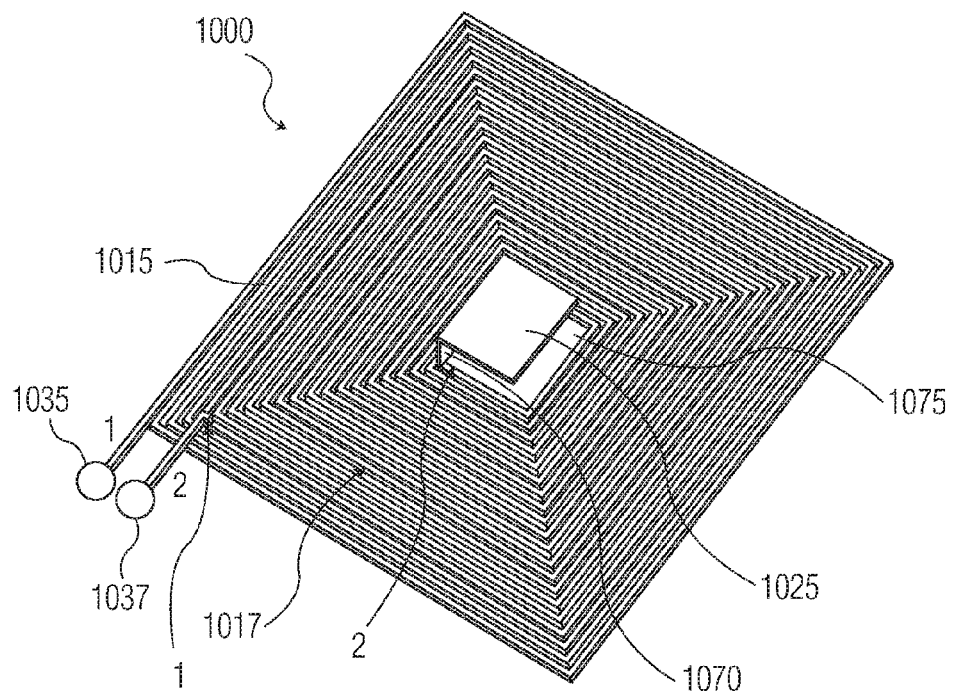
FIG. 10 illustrates a planar embodiment of a NFEMI antenna system.

FIG. 10 illustrates a planar embodiment of a NFEMI antenna system. The antenna 1000 includes a first coil 1015 and a second coil 1017 that are planar. The coils 1015 and 1017 are like the coils 615 and 617 described above. The antenna 1000 is a combination of a short loaded monopole (electric antenna) 1070 with one plate 1025 and two planar coils 1015 and 1017 (magnetic antenna). Both planar coils 1015 and 1017 are electromagnetically coupled and connected in a series arrangement. Both coils 1015 and 1017 are connected in such a way that they form a larger inductance as compared with the inductance L1 of the first coil 1015 or the inductance L2 of the second coil 1017. Both coils 1015 and 1017 may be on a carrier of plastic or other material. The first connection of the first coil 1015 is connected to the first feeding connection 1035. The second connection of the first coil 1015 is connected to the first connection of the second coil 1017 and to the second feeding connection 1037. The second connection of the second coil 1017 is connected to the small loaded dipole 1070. As shown, the plate 1025 is spaced apart from the first coil 1015 and the second coil 1017 and is over an opening 1075 in the second coil 1017. The plate 1025 may be the same size as the opening 1075 or a smaller or larger size than the opening 1075. The equivalent schematic of this antenna 1000 can be seen in FIG. 7. Likewise, the antenna 1000 may be used the transmit mode illustrated in FIG. 8 and the receive mode illustrated in FIG. 9.

In other embodiments, the plate 1025 may be situated over the first coil 1015. This location minimizes the effect that the plate 1025 has on the magnetic flux inside the first coil 1015. In order to minimize the size of the antenna 1000, the plate 1025 may be only over the first coil 1015, so as to constrain the size of the antenna 1000 to the size of the first coil 1015. Further, in such an arrangement the plate 1025 may be made larger than the size of the opening 1075 as illustrated by a broken-lined box that shows the outline of plate 1025 situated over the first coil 1015, because it will not interfere with the magnetic flux of the first coil 1015.

Figure 11:
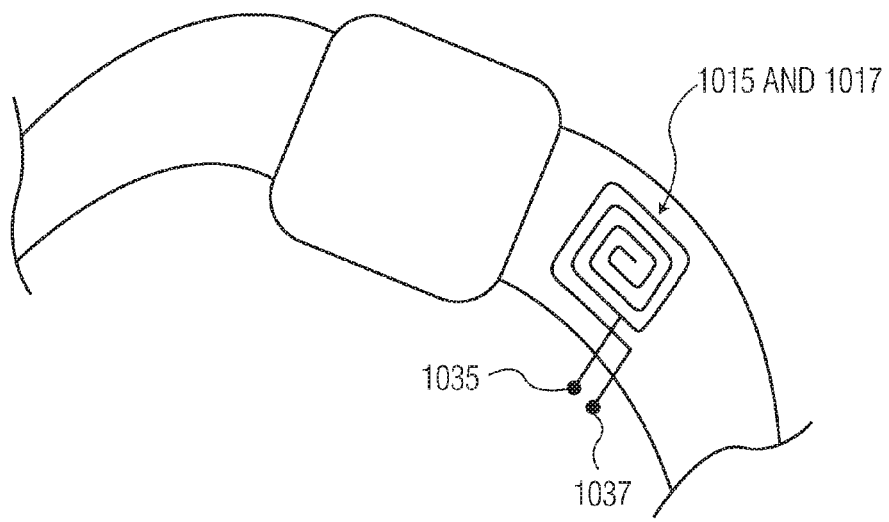
FIG. 11 illustrates the use of the antenna of FIG. 10 implemented in the wristband of a watch.

The planar arrangement of the antenna 1000 has benefits when used in wearable devices for example in a watch. Previous antennas required two plates with one on each side of the watch band. Further, in order to have effective communication, the plate on the inside of the band needed to be in contact with the user's skin. The antenna 1000 may be placed on a watch band. FIG. 11 illustrates the use of the antenna of FIG. 10 implemented in the wristband of a watch. First coil 1015 and second coil 1017 are on the outer side of the wristband while the plate, 1025 (not shown) is at the inner side of the wristband. It has been found that the antenna 1000 as implemented in such a watch, does not require the plate 1025 to be in contact with the user's skin in order to provide adequate communication capabilities.

Figure 12:
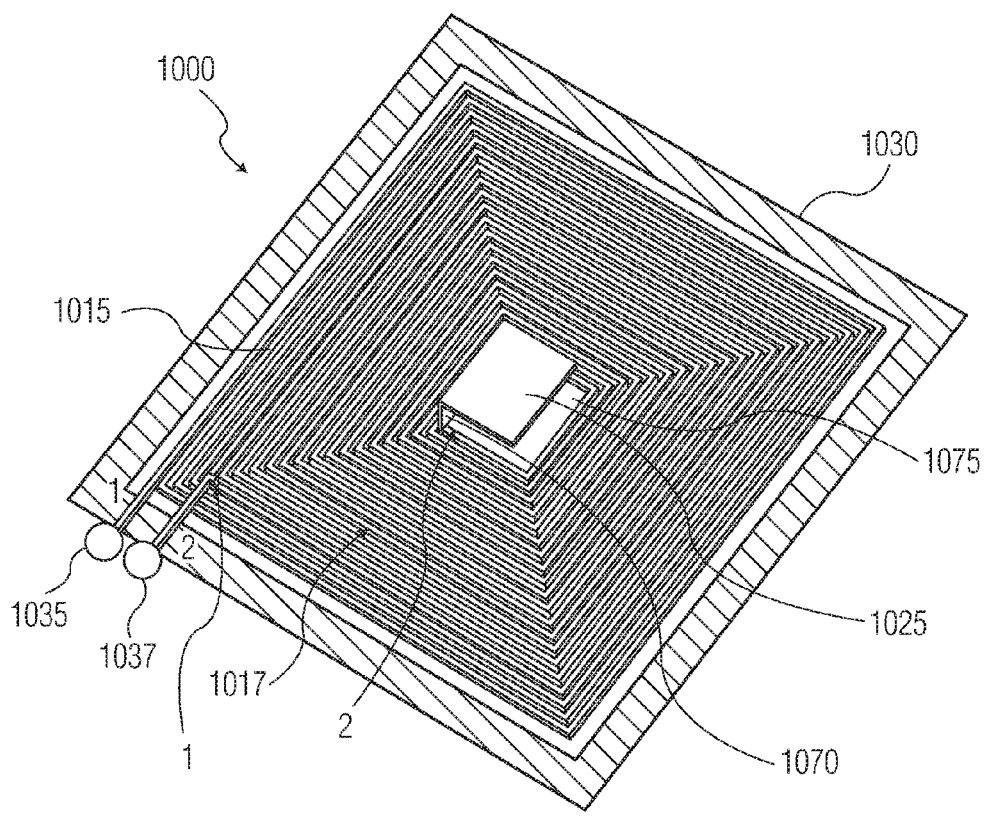
FIG. 12 illustrates another planar embodiment of a NFEMI antenna system.

FIG. 12 illustrates another planar embodiment of a NFEMI antenna system. The antenna in FIG. 12 is the same as that in FIG. 10, but adds a second plate 1030 that surrounds the first coil 1015 and second coil 1017. The second plate 1030 may be substantially coplanar with the first coil 1015 and second coil 1017. Further, the first plate may take various positions as described above with respect to FIG. 10. Further, the first plate may be partially or fully over the second plate.

It should be appreciated by those skilled in the art that any block diagrams herein represent conceptual views of illustrative circuitry embodying the principles of the invention. Further, in the circuits shown additional elements may also be included as needed, or variations to the structure of the circuit may be made to achieve the same functional results as the circuits illustrated.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A near-field electromagnetic induction antenna comprising:
    an electric dipole antenna including a first plate and a second plate spaced apart from the first plate, wherein the first and second plate form a capacitor;
    a first feeding connection and a second feeding connection; and
    a magnetic antenna including a first coil and a second coil, wherein the first coil and the second coil are mutually coupled,
    wherein a first connection of the first coil and a first plate are connected to the first feeding connection,
    wherein a second connection of the first coil and a first connection of the second coil is connected to the second feeding connection, and
    wherein a second connection of the second coil is connected to the second plate.

2. The antenna of claim 1, wherein the first coil and the second coil are wrapped around a ferrite core.

3. The antenna of claim 1, wherein the first coil and the second coil are planar coils wherein the second coil is inside the first coil.

4. The antenna of claim 3, wherein the second plate is spaced apart from the first coil and the second coil and is positioned over an opening in the second coil.

5. The antenna of claim 3, wherein the second plate is spaced apart from the first coil and the second coil and is positioned over the first coil.

6. The antenna of claim 3, wherein the first plate surrounds the first coil and the second coil and is positioned substantially coplanar with the first and second coil.

7. A near-field electromagnetic induction antenna comprising:
    an electric antenna including a plate;
    a first feeding connection and a second feeding connection; and
    a magnetic antenna including a first coil and a second coil, wherein the first coil and the second coil are mutually coupled,
    wherein a first connection of the first coil is connected to the first feeding connection,
    wherein a second connection of the first coil and a first connection of the second coil is connected to the second feeding connection, and
    wherein a second connection of the second coil is connected to the plate.

8. The antenna of claim 7, wherein the first coil and the second coil are wrapped around a ferrite core.

9. The antenna of claim 7, wherein the first coil and the second coil are planar coils wherein the second coil is inside the first coil.

10. The antenna of claim 9, wherein the plate is spaced apart from the first coil and the second coil and is positioned over an opening in the second coil.

11. The antenna of claim 9, wherein the plate is spaced apart from the first coil and the second coil and is positioned over the first coil.

12. A near-field electromagnetic induction wireless transceiver comprising:
    a near-field electromagnetic induction antenna comprising:
        an electric dipole antenna including a first plate and a second plate spaced apart from the first plate, wherein the first and second plate form a capacitor;
        a first feeding connection and a second feeding connection; and
        a magnetic antenna including a first coil and a second coil, wherein the first coil and the second coil are mutually coupled,
        wherein a first connection of the first coil and a first plate are connected to the first feeding connection,
        wherein a second connection of the first coil and a first connection of the second coil is connected to the second feeding connection, and
        wherein a second connection of the second coil is connected to the second plate;
    a signal source configured to produce a first communication signal used to drive the near-field electromagnetic induction antenna to produce generated near-field electromagnetic induction fields; and
    a receiver connected to the near-field electromagnetic induction antenna configured to receive a second communication signal using received near-field electromagnetic induction fields,
    wherein the transceiver when connected to a body is configured to communicate with another near-field electromagnetic induction wireless transceiver connected to the body.

13. The transceiver of claim 12, wherein the first coil and the second coil are wrapped around a ferrite core.

14. The transceiver of claim 12, wherein the first coil and the second coil are planar coils wherein the second coil is inside the first coil.

15. The transceiver of claim 14, wherein the first plate surrounds the first coil and the second coil and is positioned substantially coplanar with the first and second coil and wherein the second plate is spaced apart from the first coil and the second coil.

16. The transceiver of claim 12, wherein the transceiver is implemented in one of a hearing aid, headphones, or a wearable device.

17. A near-field electromagnetic induction wireless transceiver comprising:
- a near-field electromagnetic induction antenna comprising:
  - an electric antenna including a plate;
  - a first feeding connection and a second feeding connection; and
  - a magnetic antenna including a first coil and a second coil, wherein the first coil and the second coil are mutually coupled,
  - wherein a first connection of the first coil is connected to the first feeding connection,
  - wherein a second connection of the first coil and a first connection of the second coil is connected to the second feeding connection, and
  - wherein a second connection of the second coil is connected to the plate;
- a signal source configured to produce a first communication signal used to drive the near-field electromagnetic induction antenna to produce generated near-field electromagnetic induction fields; and
- a receiver connected to the near-field electromagnetic induction antenna configured to receive a second communication signal using received near-field electromagnetic induction fields,
- wherein the transceiver when connected to a body is configured to communicate with another near-field electromagnetic induction wireless transceiver connected to the body.

18. The transceiver of claim 17, wherein the first coil and the second coil are wrapped around a ferrite core.

19. The transceiver of claim 17, wherein the first coil and the second coil are planar coils wherein the second coil is inside the first coil and wherein the plate is spaced apart from the first coil and the second coil.

20. The transceiver of claim 17, wherein the transceiver is implemented in one of a hearing aid, headphones, or a wearable device.

\* \* \* \* \*